May 5, 1964     P. E. RICHARDSON ETAL     3,132,266
AUTOMATIC INDEXING ARRANGEMENTS FOR ROTARY STUD SWITCHES
Filed March 28, 1960

Inventors
P. E. Richardson
J. R. Dunworth
By Scrock Downing Seebold
Attys

United States Patent Office 3,132,266
Patented May 5, 1964

3,132,266
AUTOMATIC INDEXING ARRANGEMENTS FOR ROTARY STUD SWITCHES
Peter Ernest Richardson and James Robert Dunworth, Beckenham, England, assignors to Muirhead & Co., Limited, Beckenham, England
Filed Mar. 28, 1960, Ser. No. 18,144
Claims priority, application Great Britain Apr. 27, 1959
5 Claims. (Cl. 307—141.4)

This invention relates to automatic indexing arrangements for rotary stud switches.

A rotary stud switch is commonly used in instrument practice for varying an electrical quantity, for instance, resistance, capacitance, inductance and such like by successive and discrete amounts and also to perform various circuit switching functions. A rotary switch may comprise a disc of insulating material carrying on one face a ring or portion of a ring of contact studs adjacent the periphery, the studs passing through the disc and terminating on the other face in tags or soldering spills for connecting the switch to the external circuit and a collector ring or portion of a ring within and concentric with the ring of studs also provided with a soldering tag. A double-ended brush or wiper makes contact with the ring of studs and the collector ring and is rotatable about the axis of the disc by means of a shaft. Two or more switches of the type described may be ganged to a common shaft.

In certain applications a detent or click device is provided accurately to locate the brush with individual studs.

It is an object of the present invention to provide means for automatically indexing a rotatable member through discrete and predetermined angles.

The invention consists in an automatic indexing arrangement for a rotary stud switch comprising means for advancing the rotatable member or brush of said switch progressively from stud to stud in known manner or progressively from one stud to another while passing over one or more intermediate studs and manually operable means whereby the rotatable member may be rotated over any number of studs and in either direction independently of the action of the automatic indexing means. The manual control conveniently may be a knob, handwheel or similar device attached to the switch shaft.

The invention further consists of an automatic indexing arrangement for a rotary stud switch as claimed in claim 1 in which a prime mover rotates the rotatable member of the rotary stud switch at a predetermined speed through a coupling means which provides in addition over-riding manual control means, and the prime mover is started by an electrical pulse and is stopped by suitable switching means when the rotatable member arrives at a predetermined position. This cycle of events may be repeated by further starting pulses.

The prime mover may be an electric motor operating through a reduction gear.

For accuracy of indexing the motor is provided with braking means which come into operation immediately the supply to the motor is cut off thereby limiting the over-run to negligible proportions. The coupling means, hereinafter to be called the "click plate clutch" comprises a driving member, a coupling member and a driven member, said driven member being connected to the switch shaft and said driving member being connected to the motor over the reduction gear. The driven member may carry a number of indents, corresponding to the number of indexing positions, circularly disposed on the face of said member facing the driving member. The coupling member preferably comprises one or more steel balls normally held in corresponding indents in the driven member by a spring which is itself attached to the driving member.

The spring pressure holding the ball in the indent is adjusted so that the ball will not ride out of the indent due to the friction torque of the switch thus providing a positive, though resilient, drive. It will be apparent that application of a torque to the switch shaft, for example, by the manual control which is in excess of that of the click plate clutch will cause the ball to be forced out of the indent and the switch shaft will rotate independently of the motion of the driving member. Upon removal of the manually applied torque the ball will be forced into one of the indents of the driven member and automatic indexing will be restored. With the motor drive stationary the device effectively becomes a manually operated switch with a detent or click action as hereinbefore described.

The invention will be further described with reference to the accompanying drawings in which.

Figure 1:
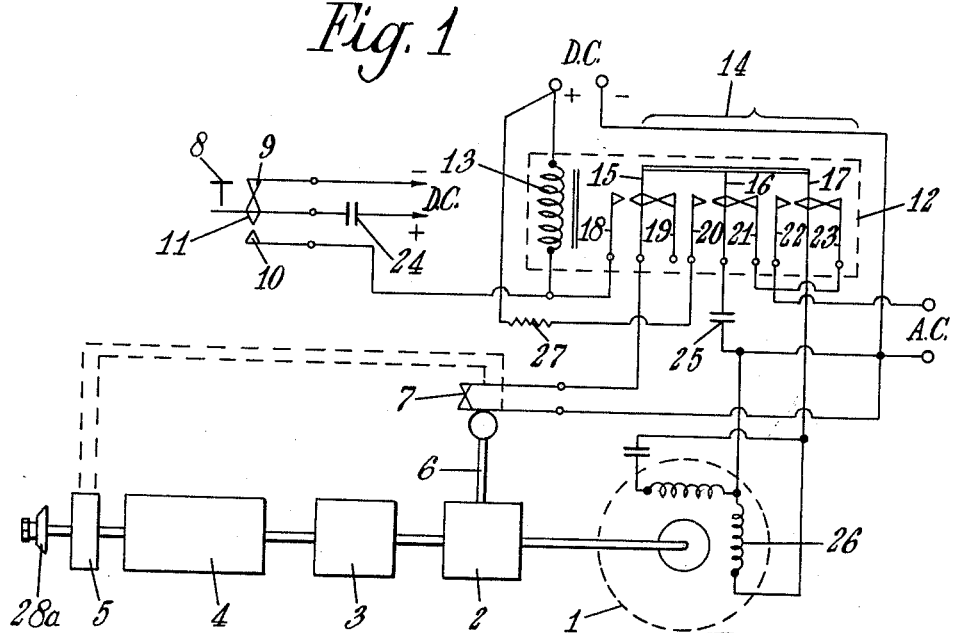
FIGURE 1 shows an arrangement of an automatic indexing switch embodying a click plate clutch.

FIGURE 1 shows an arrangement for an automatic indexing switch according to the invention, in which electric motor 1, which may be a two-phase induction motor arranged to operate in known manner from a single phase A.C. supply, drives reduction gear box 2, the low speed output shaft of which is rotatably coupled to the input of a click plate clutch 3. The output shaft of click plate clutch 3 is rotatably coupled to the shaft of main switch 4 and auxiliary switch 5, the purpose of which will be described hereinafter.

The main switch 4 is provided with $n$ equally spaced switch positions over 360° and may comprise a plurality of switch decks operable from a common shaft. Shaft 6 of gearbox 2 is arranged to rotate at $n$ times the speed of the switch shaft and thereby operate spring contacts 7 once per revolution by some suitable means, for example, a cam. Furthermore, the phasing of the spring contacts 7 is adjusted so that the contacts open each time the switch brush is positioned on a contact stud. Automatic indexing is started by depression, e.g. by means of a press button 8 associated with a spring set comprising fixed contacts 9 and 10 and moving contact 11. Automatic indexing is maintained by the action of relay 12 which includes energizing coil 13 and spring set 14 comprising moving contacts 15, 16 and 17 and fixed contacts 18 to 23 inclusive. A D.C. supply derived from a suitable source, energizes relay 12 and charges condensers 24 and 25. The motor is energized from a suitable A.C. source. Automatic indexing is effected as follows:

With the apparatus in the inoperative position press button 8 is released and condenser 24 is charged from the D.C. supply over contacts 9 and 11. Relay 12 is released and the contacts of spring set 14 are shown in the figure. The contacts of spring set 7 are closed and therefore, as hereinbefore explained, the brush of switch 4 rests accurately on one of the contact studs. Contacts 17 and 22 being open the A.C. supply is cut off from the motor 1 and condenser 25 is discharged over contacts 16–21, 17–23 and winding 26 of motor 1. On depressing button 8 condenser 24 is discharged through relay winding 13 over contacts 10–11. The resultant surge of current causes the relay to operate and contacts 15, 16 and 17 of spring set 14 move to the left making contact with 18, 20 and 22 respectively. Relay 12 is now continuously energized from the D.C. supply over latching contacts 15–18 and the closed contacts of spring set 7. The action of the relay connects the A.C. supply to the motor windings over contacts 17–22, disconnects condenser 25 from motor winding 26 and connects same to the D.C. supply over contacts 16–20 and current limiting resistor 27. Condenser 25 is then charged to the potential of the D.C. supply. The A.C. supply being now connected the motor 1 commences to run and drives main switch 4 and auxiliary switch 5 via the reduction gearbox 2 and click plate clutch 3. Shaft 6, rotating $n$ times the speed of the switch shaft, will cause the contacts of spring set 7 to open at the same time as the switch brush is centered accurately over the next contact stud. When spring set 7 is open the D.C. maintaining circuit of relay 12 is broken, the relay releases and moving contacts 15, 16 and 17 move to the right cutting off the A.C. supply to the motor and connecting condenser 25 in series with motor winding 26. Since condenser 25 is charged to the potential of the D.C. supply the resultant surge of direct current in motor winding 26 will lock the armature and bring the motor almost instantaneously to a standstill. It will be seen that inoperative condition has now been restored but the switch has been indexed by one stud. Further indexing is achieved by again depressing button 8 thereby initiating the cycle of events just described.

It must be understood that at the commencement of a cycle of events spring set 7 should normally be closed in order to complete the relay energizing circuit and to this end the "open" period of said spring set should be short (about 95% on/off ratio). When such a quick setting device is used the cycle of events will still be initiated even though spring set 7 is open at the time of initiation because, by the choice of suitably large capacitance for condenser 24, the discharge current may be maintained for a sufficient length of time to enable the contacts of spring set 7 to close, whereupon the cycle of events will continue.

When it is required to programme the switch for special purposes, use may be made of auxiliary switch 5. For example, if it is desired to index the main switch 4 to alternate studs the auxiliary switch may be adapted to short circuit the contacts of spring set 7 (as indicated by the broken lines) when these open the intermediate stud positions. Obviously, many other alternatives are possible.

Figure 2:
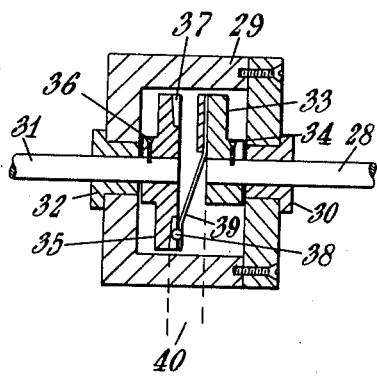
FIGURE 2 shows a click plate clutch embodying a single ball in the coupling member.

Referring now to FIGURE 2, driving shaft 28 is mounted in supporting structure 29 and is rotatable in bearing 30. Driven shaft 31 is likewise mounted in a structure 29 and is rotatable in bearing 32. Driving member 33 is secured to driving shaft 28 by set screw 34 and driven member 35 is secured to driven shaft 31 by set screw 36. Driven member 35 is provided with a number of indents in the form of radial V-section slots 37, the number of said slots being equal to the number of indexing positions required. Steel ball 38 is retained in one of the indents 37 by one end of spring 39, the other end of said spring being attached to driving member 33. Steel ball 38 and spring 39 in combination constitute the coupling member 40. The pressure of the spring on the ball is set so that when the driving shaft is rotated the ball will not ride out of the indent under the influence of the mechanical load on the driven shaft and the latter will be driven by the driving shaft.

Figure 3:
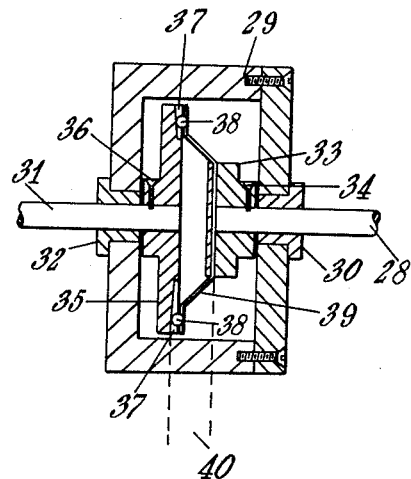
FIGURE 3 shows a click plate clutch embodying a plurality of balls in the coupling member.

FIGURE 3 wherein like reference characters refer to like parts in FIGURE 1, show a further embodiment of a click plate clutch in which the coupling member 40 comprises two balls 38 in diametrically opposite indents in a driven member 35 having an even number of indents equally spaced. Spring 39 attached to driving member 33 provides the pressure necessary to retain the balls in said indents. It will be apparent to those versed in the art that other constructions employing a plurality of balls are possible. Multiple ball constructions are advantageous where the torque on the output shaft is relatively heavy in that the necessary spring pressure to resist said torque is not confined to a single ball and, furthermore, it may be possible to effect a balanced arrangement of the balls such that side thrusts in the driving and driven shafts are eliminated.

By the action of the click plate clutch as hereinbefore described, the switch 4 may be manually operated by knob 28a at any time whether or not an automatic cycle is taking place. When operating in the manner of a normal manually operated switch with automatic indexing out of action it is necessary to ensure that the switch torque does not cause the driving member of the click plate clutch to rotate; an independent mechanical brake may be fitted to the gearbox to prevent this occurring, or it has been found that the same object may be achieved by ensuring that the gearbox has negligible backlash and that its efficiency is less than 50%.

The latter method increases the power requirement of the motor but has the merit of simplicity. For most applications the motor and its power source may be only intermittently rated.

The advantage of operating spring set 7 from an appropriate lay-shaft in the reduction gearbox instead of from the switch shaft, is that any error in alignment or setting up of the switch is greatly reduced. For example, using a 24 stud switch at 3° error at the gearbox would represent only $\frac{1}{24}$ of 3° or $\frac{1}{8}$ of a degree at the switch shaft which could be ignored for all practical purposes.

The device of the invention is silent in operation when compared with other devices that have been tried involving the use of power solenoids and the smooth continuous action ensures long life of the working parts. The indexing accuracy is very high (approximately 1% of position interval for the above mentioned application). It is capable of normal manual control at any time irrespective of whether the automatic drive is running. It is impossible to jam or automatically to mis-index the drive. Any manual mis-indexing is automatically corrected by the automatic drive. The device may be easily programmed to pass over certain switch positions as required. The electrical power required to operate the device is very small.

Various modifications will be apparent to those skilled in the art without departing from the scope of the invention. Thus, instead of the cam operated button 8 the spring set 9, 10, 11 could be operated as the contact assembly of another relay energized from a trigger circuit having a predetermined time constant which governs the rate of indexing or stepping of the switch.

We claim:

1. An automatic indexing arrangement comprising a main rotary stud switch having a fixed and a rotatable member and a plurality of studs, a prime mover for connection to each of the studs in turn, a coupling means between the prime mover and the rotatable member so that the rotatable member may be manually rotated independently of the prime mover, an auxiliary rotary stud switch coupled to rotate with the main rotary stud switch, switch means for starting the prime mover and stopping it when the rotatable member has rotated from one stud to another and switch means operated by the auxiliary rotary stud switch for inhibiting the stopping of the prime mover on selected studs of the main rotary stud switch.

2. An automatic indexing arrangement comprising a rotary stud switch having a fixed and a rotatable member and a plurality of studs, a prime mover for rotating the rotatable member to establish connection to the studs in turn, a coupling means between the prime mover and the rotatable member so that the rotatable member may be manually rotated independently of the prime mover, switch means for starting the prime mover and stopping it when the rotatable member has rotated from one stud to another, a shaft coupled to rotate with the rotatable member, the switching means for stopping the prime mover comprising an electrical contact operated once per revolution of said shaft, the speed of which is related to the speed of the rotatable member by the expression $S = (360/n)R$ where S is the speed in revolutions per minute of the shaft, $n$ is the angular spacing in degrees of arc of the studs of the rotary stud switch and R is the speed in revolutions per minute of the rotatable member.

3. An automatic indexing arrangement as claimed in claim 2, in which the prime mover is an electric motor operating through a reduction gear.

4. An automatic indexing arrangement as claimed in claim 3 in which the motor is provided with braking means which come into operation immediately the supply to the motor is cut off.

5. An automatic indexing arrangement as claimed in claim 4, in which the braking means consist of a condenser which upon disconnecting the supply to the motor is discharged through the motor windings so as to oppose the motion of the armature.

References Cited in the file of this patent

UNITED STATES PATENTS

| | | |
|---|---|---|
| 2,652,197 | Berger | Sept. 15, 1953 |
| 2,901,615 | Devendorf | Aug. 25, 1959 |
| 2,929,259 | Chamberlain | Mar. 22, 1960 |
| 2,965,829 | Lingenbrink | Dec. 20, 1960 |